J. PARK.
Churn.
No. 29,397.
Patented July 31, 1860.
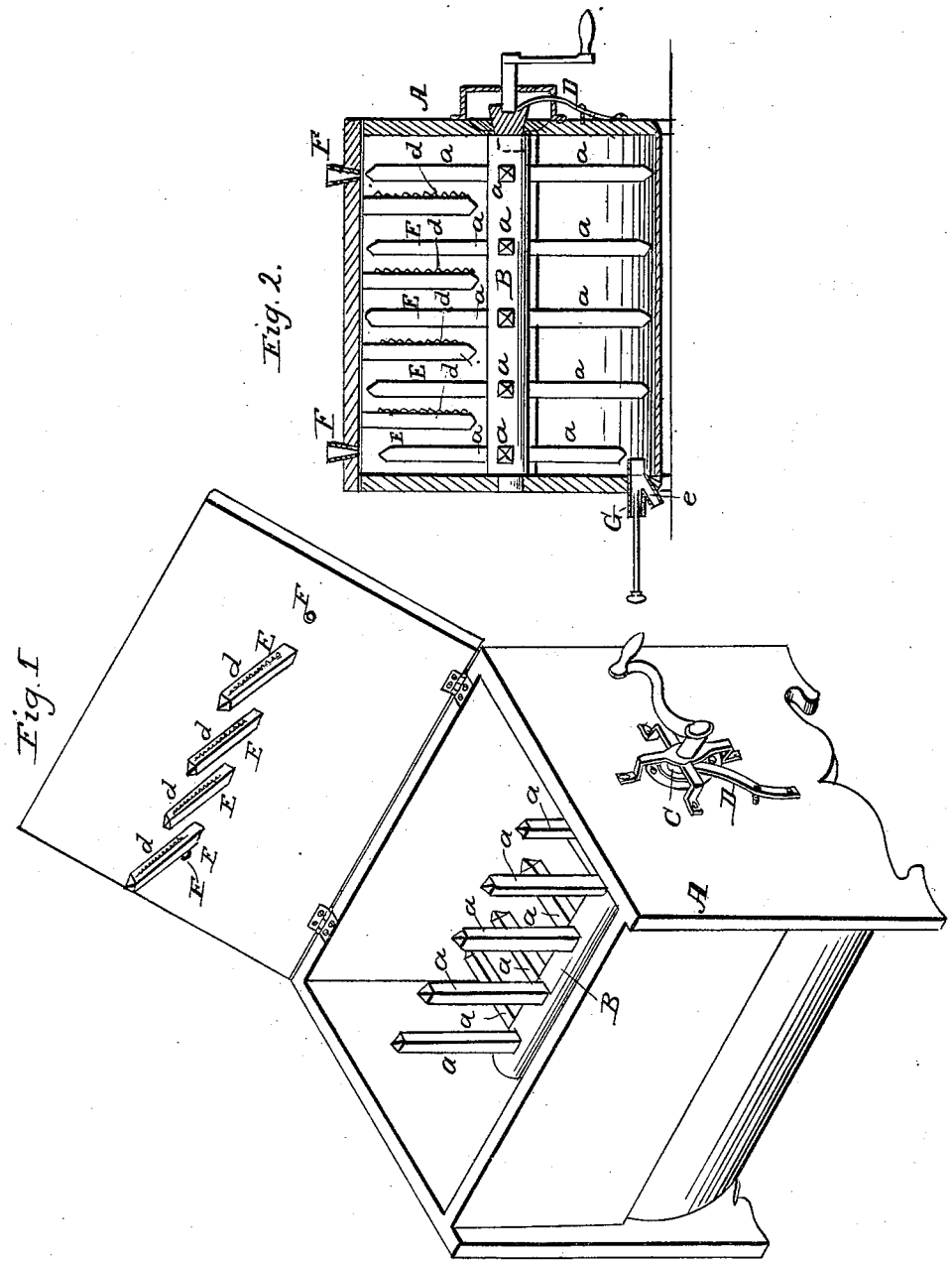

UNITED STATES PATENT OFFICE.

JOHN PARK, OF JOLIET, ILLINOIS.

CHURN.

Specification of Letters Patent No. 29,397, dated July 31, 1860.

*To all whom it may concern:*

Be it known that I, JOHN PARK, of Joliet, in the county of Will and State of Illinois, have invented a new and Improved Churn and Butter-Dresser, that will churn the cream or milk, and work all the milk and whey out of the butter, and mix the salt evenly through the butter, and take any chance hairs out of it while churning and press the water out of the butter and gather it into rolls, ready to be put away for use, and all done while yet in the churn, leaving the churn washed clean, ready to set away, all done by simply turning the crank and in half the ordinary time of churning and dressing butter; and I do hereby declare that the following is a full and exact description thereof, reference being had to the accompanying drawings, and to the letters of reference marked thereon.

The nature of my invention consists in making a square box-churn of boards of any required size with a circular bottom so as to form a half-circle. At the bottom of the square part of the box, as shown at "A" in the accompanying drawings, Figure 1, is a wooden cylinder of about three inches in diameter, with four rows of pins in it about one inch square—length to vary according to the size of the churn—without rubbing on the inside of the circle, as shown at "B," Fig. 2, in the drawings. I then form a lid with one row of pins set in it of the same size and of sufficient length to nearly touch the cylinder when shut down, as shown at "C" in the drawings, Fig. 2, so when the lid is shut the pins in the cylinder will revolve through between the pins that are in the lid, and break or churn the milk or cream; and when all the milk is let off by a faucet, and a pail of water thrown into the churn, by turning the crank eight or ten times around the pins in the cylinder will press and wash the butter through the pins in the lid; and on the corner of each pin in the lid I set in a thin or narrow piece of tin or other metal, so as to project about an eighth of an inch with fine teeth cut in it in order to catch any odd hairs that might be in the milk in the act of churning as shown by dots on the corner of pin at letter "M" of drawings, Fig. 2.

I have constructed a faucet made of zinc or other metal about three inches long with one tube to go through into the bottom of the end board of the churn with a wooden pin, with a piece of india-rubber packing fastened to the point of the pin to fit the tube to push back and forward in the tube to open and shut the faucet and let the milk and water off. I then have another tube so formed as to connect with the main tube about half way from each end of the main tube at the lower side as shown at letters D—D, in drawings Fig. 1. I then set in two air tubes about an inch and a half long to let in air to the milk while churning, as shown at E, E, in drawings Fig. 1. I then put in two iron rods with screws and burrs, as shown at letter F, Fig. 2, in the drawings. I then make a metal gudgeon in the form of a cone as shown at E, in the drawings, Fig. 3. I then make a zinc or other metal boxing to fit the gudgeon as shown at H, of drawings Fig. 3. I then have a spring screwed on the end of the churn to press against a shoulder on the gudgeon to keep the gudgeon tight in the boxing while churning, as shown at I, in drawings, Fig. 3. I have a square end an inch and a half on the end of the gudgeon order to get the cylinder out of the churn which is to go into a square metal boxing set into the end of the cylinder, so when the crank is turned it will turn the cylinder as shown at J, Fig. 3, in the drawings. In order to get the cylinder out of the churn the gudgeon should be drawn back against the frame that it runs in as shown at K, K, of drawings, Fig. 3. I then place a small iron rod about two inches long and three-eighths of an inch in diameter through the opposite end of the churn into a metal boxing in the end of the cylinder for a center for the cylinder to revolve on, and to be drawn back when the cylinder is to be taken out, as shown at L of drawings, Fig. 1.

What I claim as my invention, and desire to secure by Letters Patent, is—

1. An improvement on churns heretofore patented for churning and dressing butter as set forth in the foregoing specifications.

2. The rows of pins in the cylinder and the row of pins in the lid for churning, and dressing the butter ready for use while in the churn.

3. The faucet mentioned in the above specifications.

4. The gudgeon of conical shape to prevent the churn from leaking.

5. The spring, as applied, for pressing the gudgeon into the boxing.

6. The tin strips or other metal fastened to the pins in the lid for catching the hairs, while churning.

7. The air tubes in the lid as applied and used.

JOHN PARK.

Witnesses:
A. WILLIAMS,
F. McDONOUGH.